No. 840,492. PATENTED JAN. 8, 1907.
G. D. HOPPES.
SEPARATOR.
APPLICATION FILED JULY 20, 1906.

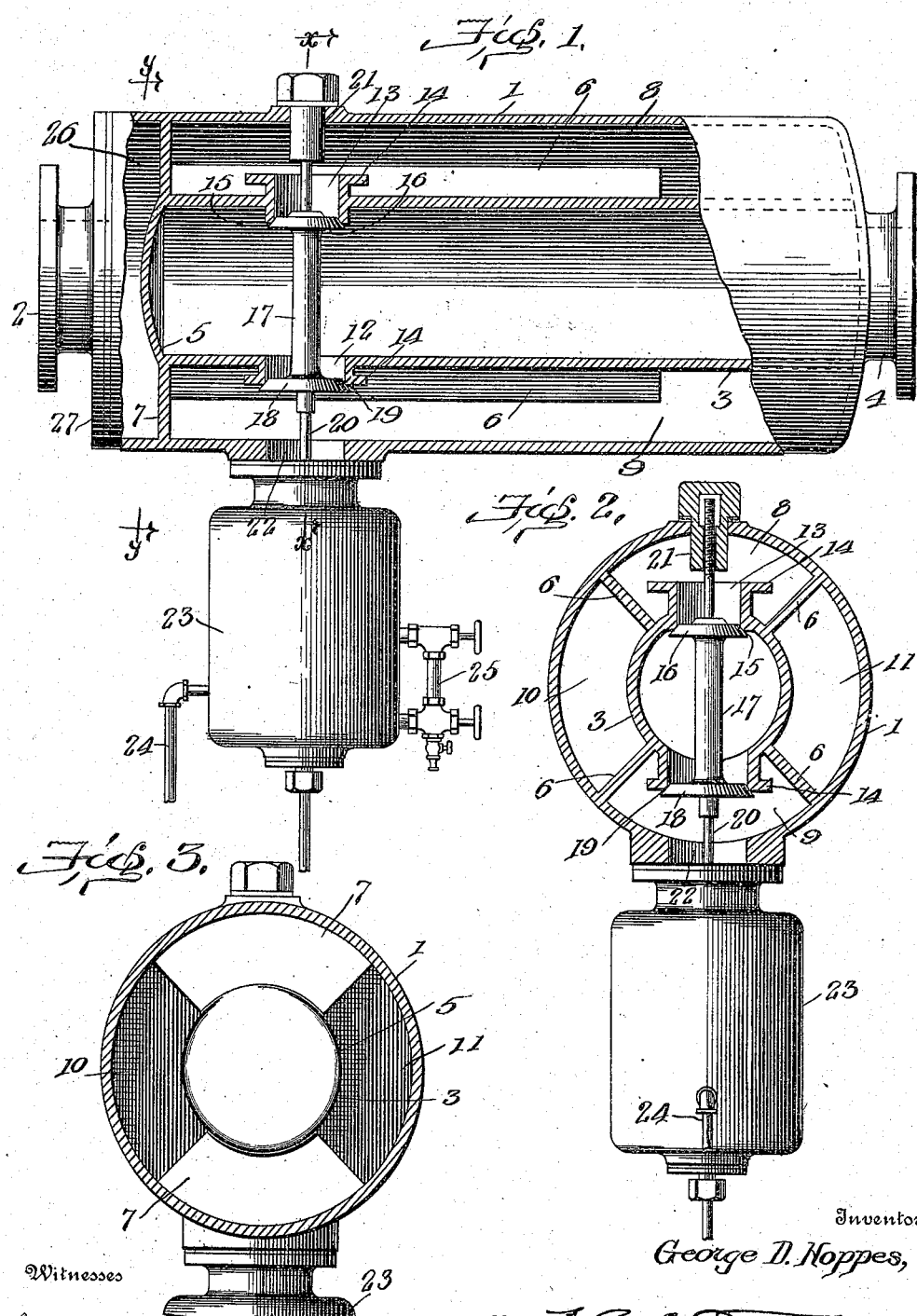

2 SHEETS—SHEET 2.

Witnesses
G. Howard Walmsley
Edward L. Reed

Inventor
George D. Hoppes,

By H. A. Toulmin.
Attorney

UNITED STATES PATENT OFFICE.

GEORGE D. HOPPES, OF SPRINGFIELD, OHIO.

SEPARATOR.

No. 840,492. Specification of Letters Patent. Patented Jan. 8, 1907.

Application filed July 20, 1906. Serial No. 327,006.

*To all whom it may concern:*

Be it known that I, GEORGE D. HOPPES, a citizen of the United States, residing at Springfield, in the county of Clark and State of Ohio, have invented certain new and useful Improvements in Balance-Valve Steam-Separators, of which the following is a specification, reference being had therein to the accompanying drawings.
This invention relates to steam-separators of the type used in connection with steam-boilers to free the steam from particles of moisture and foreign matter before it enters the engine.
The object of the invention is to provide such a separator that will effectively accomplish this result and which will be simple in construction and easy of access for the purpose of cleaning or repairing.
With these objects in view my invention consists of the construction hereinafter described, and more particularly pointed out in the claims.

Figure 4:
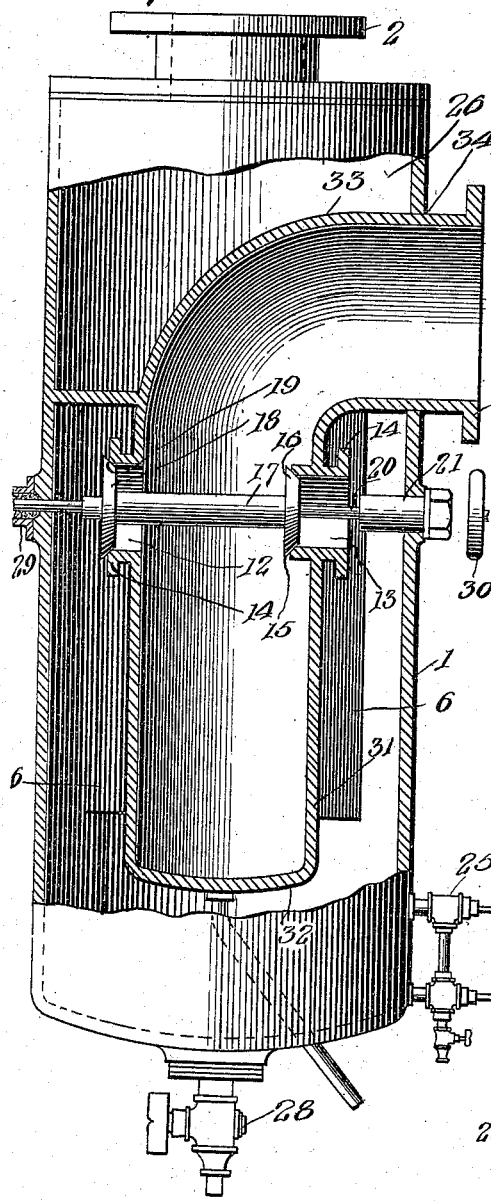
Figure 5:
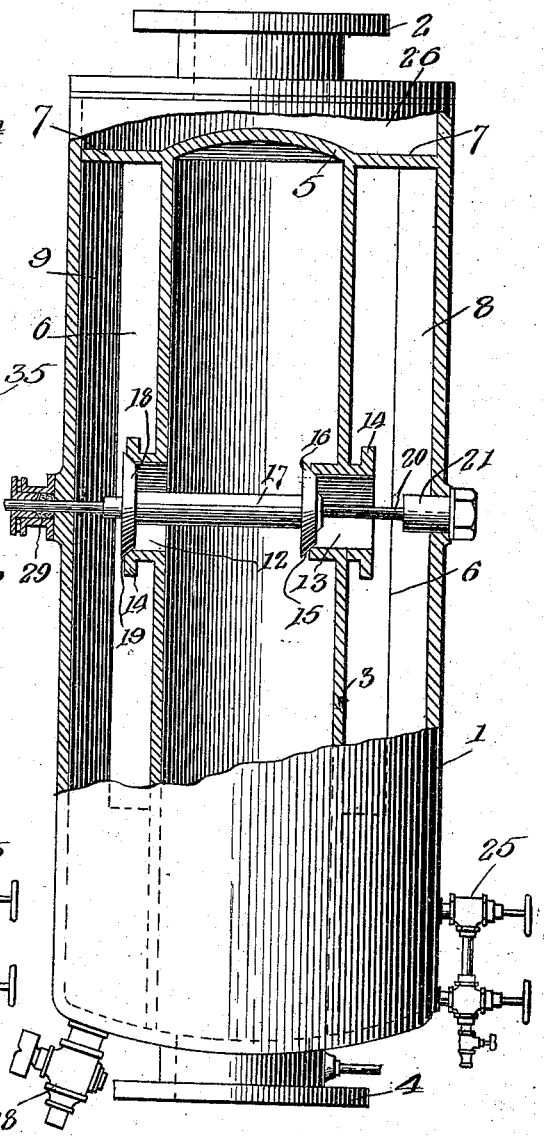

In the accompanying drawings, Figure 1 is a side elevation of my separator, partly in section. Fig. 2 is a transverse section taken through the same on the line $x\ x$ looking in the direction of the arrows. Fig. 3 is a similar section taken on the line $y\ y$. Fig. 4 is a modification of my device, and Fig. 5 is a further modification of the device.

In carrying out my invention I employ an outer cylindrical casing 1, preferably of boiler metal, provided at one end with an opening 2, leading to the source of steam-supply and having the opposite end closed. Within the casing 1 and preferably arranged concentric therewith is a second cylindrical casing 3 of less length than the outer casing, having an outlet-passage 4 in that end of the casing 3 which is opposite to the opening 2 of the casing 1, which extends through the closed end of the outer casing to the engine. The end of said casing 3 which is adjacent to said opening 2 of the casing 1 is closed, as shown at 5. Between the outer and inner cylindrical casings 1 and 3 I arrange a series of partitions 6, preferably four in number, which extend between the sides of the said casings and from the closed end of the inner casing 3 to a point near the open end thereof, thereby dividing the space between the two casings into a series of passages. Two of these passages have the ends adjacent to the opening 2 of the casing 1 closed with steam-tight closures 7, the other two passages being open to permit the passage of steam from the inlet-opening 2. In the preferred construction I close the upper and lower passages 8 and 9 and leave the lateral passages 10 and 11 open for the passage of the steam.

The inner casing 3 is provided on its opposite sides, at a point near the closed end thereof, with openings 12 and 13, connecting the passages 8 and 9 with the interior of the said casing. These passages are provided at the outer edges with outwardly-extending flanges 14, which are adapted to deflect the water of condensation which may gather upon the partitions or the exterior of the casing 3 and prevent the same from passing through the openings 12 and 13 into the casing 3. These flanges are preferably formed by an annular extension around the edges of the passages 12 and 13 and having the upper portion bent at right angles thereto and forming a surrounding flange.

The inner edge of the passage 13 is provided with a valve-seat 15 and a valve 16, connected by a sleeve 17 with a valve 18, which engages the valve-seat 19 on the outer face of the passage 12. The sleeve 17, carrying the valve members 16 and 18, is mounted upon an operating-rod 20, the upper end of which is mounted in a nipple 21, secured in the upper surface of the casing 1, and may be either screw-threaded within said nipple or mounted in any suitable manner. The opposite end of the rod 20 extends through the lower side of the casing to a point convenient for operating the same and is there provided with operating means, such as a wheel of ordinary construction. At a point along the lower surface of the outer casing 1 I provide an outlet-passage 22, connecting the passage 9 with a water-receptacle 23, which is provided with an outlet-pipe 24 and a water-gage 25 of ordinary construction.

With the parts constructed as herein described and the inlet-opening 2 connected with a suitable source of steam-supply and the outlet-opening 4 connected with an engine the steam is admitted through the opening 2 into the chamber 26, which is formed between the head of the receptacle 3, in conjunction with the adjacent partition 7 and the end 27 of the casing 1. From this chamber the steam enters the lateral passages 10 and 11, passes through the same to the opposite end of the casing 1, where it turns about the lower end of the partition 6 and passes through the passages 8 and 9 to the upper end thereof, thence through the openings 12 and 13, past the valves 16 and 18, which have been opened by the operator or engineer into the interior of the casing 3, and thence to the engine by way of the outlet-passage 4. The rapid passage of the steam around the lower ends of the partition 6 and around the sharp angle of the flanges 14 of the passages 12 and 13 tends to throw off all heavy particles contained in the steam, such as condensed moisture and all foreign substances, whereby the steam which enters the interior of the casing 3 and passes on to the engine is rendered free from all such substances. The water or other matter which is thrown off from the steam enters into the lower passage 9 and collects in the receptacle 23, from which it is drawn off by the water-outlet pipe 24.

In order to adapt my separator for use in a vertical position, I make a few minor changes therein, as shown in Fig. 5, in which the casing and the interior arrangement are the same as in Fig. 1, but in which I have dispensed with the water-receptacle 23 and placed the water-gage 25 on the side of the outer casing 1 at a point near the bottom thereof and have also provided this outer casing 1 with an outlet-cock 28, the operating-rod 20 for the valve members extending through a stuffing-box 29 and being provided with a handle 30 of any suitable construction. With these changes in the construction it is possible to mount the separator in a vertical position, and the operation will be the same as that described with reference to Fig. 1, save that the water of condensation will gather in the lower end of the casing 1 and will be drawn off through the outlet-cock 28.

In order to adapt the separator for use in positions where it is necessary or convenient to have the inlet and outlet passages both at the same end of the separator, I provide the construction shown in Fig. 4, which is similar in all material features to that shown and described in Fig. 1, but in which the inner casing 31 is closed at its lower end, as shown at 32, and has its upper end formed with an elbow 33, extending through the outer side of the casing 1, as shown at 34, and provided on the outer end of said elbow with a flange 35 for connecting the same with the usual steam-pipe leading to the engine. In this construction the operation is substantially the same as that before described save that the steam passes around the lower end of the partition 6, thence through the passages 12 and 13, and out through the upper end of the casing 31 instead of the lower end thereof, as in the case of the other constructions.

By the use of the construction herein described, embodying the concentric cylinders or casing separated by the partitions and the controlling-valve within the separator and connecting the interiors of the two cylinders, I am enabled to bring about the separation of the steam very close to the engine, thereby doing away with lengthy connecting-pipes and furnishing the steam to the engine in an exceedingly dry condition.

Having thus fully described my invention, what I claim as new, and desire to secure by Letters Patent, is—

1. A steam-separator comprising inner and outer casings, a plurality of passages formed between said casings and means for connecting said passages with the interior of the inner casing.

2. A steam-separator comprising an outer casing connected to a source of steam-supply, an inner casing connected with an engine, and a plurality of passages formed between said casings, one of said passages being connected with the interior of the inner casing.

3. A steam-separator comprising an outer casing connected to a source of steam-supply, an inner casing connected to a steam-engine, partitions extending between said casings, and means for passing the steam around one end of said partitions and into the interior of said inner casing.

4. A steam-separator comprising inner and outer casings, passages formed between said casings, a part of said passages having their ends closed adjacent to the steam-inlet and the other passages having their ends open adjacent to said inlet, and a valve connecting said closed passages with the inner casing.

5. A steam-separator comprising an outer casing having one end connected with the source of steam-supply and the opposite end closed, an inner casing having one end connected with an engine and the opposite end closed, partitions extending between said inner and outer casings and forming passages, a part of said passages having their ends closed at the open end of said outer casing and the other passages having their ends open at the open end of said casing, a port connecting said closed passages with the said inner casing, and means for controlling said port.

6. A steam-separator comprising inner and outer casings, partitions between said casings extending a portion of the length of the same and dividing the space between said casings into passages, a part of said passages having one end closed against the entrance of steam and the remaining passages being open, and means for connecting said closed passages with the interior of said inner casing.

7. A steam-separator comprising an outer casing having one end connected to the source of steam-supply and its opposite end closed, an inner casing arranged within said outer casing and of less length than said outer casing, having one end connected with a steam-engine and its opposite end closed, partitions between said inner and outer casings extending a portion of the length thereof and dividing the space between said casings into passages, a portion of said passages having their ends adjacent to the inlet to said outer casing closed against the passage of steam, and means for connecting said closed passages with the interior of said inner casing, the remaining passages having their corresponding ends open.

8. A steam-separator comprising an outer casing having one end connected to a source of steam-supply and its opposite end closed, an inner casing of less length than said outer casing having that end adjacent to the inlet-opening in said outer casing closed and its opposite end connected to an engine, partitions extending from the closed end of said inner casing to a point near the opposite end thereof and dividing the space between said casings into passages, a part of said passages having the end adjacent to the steam-inlet of the outer casing closed, apertures connecting said closed passages with the interior of said inner casing, valves controlling said apertures, a valve-rod for operating said valves extending through said outer casing, and a water-outlet connected to one of said closed passages.

9. A steam-separator comprising inner and outer casings, passages formed between said casings, a part of said passages having one end closed against the entrance of steam, apertures connecting said closed passages with the interior of said inner casing, flanges surrounding said apertures and extending into said closed passages, and valves for controlling said apertures.

10. A steam-separator comprising an outer casing having one end connected to the source of steam-supply and the opposite end closed, an inner casing of less length than the outer casing and supported within the same, said inner casing having one end connected to a steam-engine and the opposite end closed, radial partitions of less length than said inner casing extending between said inner and outer casings and dividing the space between the same into passages, a part of said passages having transverse partitions closing the ends of the same near the closed end of said inner casing, the remaining passages being open, a valve-controlled aperture connecting said closed passages with the interior of said inner casing, annular flanges surrounding said apertures and extending into said closed passages, and a water-receptacle supported beneath said separator and connected to one of said closed passages.

11. A steam-separator comprising inner and outer casings, radially-arranged steam-passages between said casings, angular projections in said passages, and a steam-controlling-valve connecting the interiors of said casings.

12. In a steam-separator, the combination, with the inner and outer casings and radially-arranged passages between said casings, of a port connecting said passages with the inner casing, and a valve controlling said port.

13. In a steam-separator, the combination, with an outer casing and an inlet-chamber at one end thereof, of an inner casing within said outer casing, a plurality of passages surrounding said inner casing, the alternate passages being connected with said inlet-chamber, and means for connecting all of said passages at the ends opposite said inlet-chamber.

14. In a steam-separator, the combination, with an inner and an outer casing, of a plurality of passages between said casings and extending longitudinally thereof, the alternate passages being connected near one end of said casing with a source of steam-supply, and an annular conduit connecting said passages with the opposite end of said casing.

In testimony whereof I affix my signature in presence of two witnesses.

GEORGE D. HOPPES.

Witnesses:
E. O. HAGAN,
EDWARD L. REED.